US007822428B1

(12) United States Patent
Morris et al.

(10) Patent No.: US 7,822,428 B1
(45) Date of Patent: Oct. 26, 2010

(54) MOBILE RICH MEDIA INFORMATION SYSTEM

(75) Inventors: James T. Morris, San Francisco, CA (US); Samuel J. MacDonnell, Montara, CA (US); Dmitri B. Abramov, San Mateo, CA (US); Laurent E. Sellier, San Francisco, CA (US); David Bliss, San Francisco, CA (US); Jacquie Moss, San Francisco, CA (US); Norman K. Meyrowitz, San Francisco, CA (US); Brian P. Connolly, San Francisco, CA (US); Basil C. Hosmer, Winchester, MA (US); Saurav Chatterjee, Foster City, CA (US); Christopher O. Peterson, Berkeley, CA (US); Guno Sutiono, Burlingame, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1538 days.

(21) Appl. No.: 10/791,298

(22) Filed: Mar. 1, 2004

(51) Int. Cl.
| | |
|---|---|
| H04B 7/00 | (2006.01) |
| H04H 20/74 | (2008.01) |
| H04M 1/66 | (2006.01) |
| H04W 4/00 | (2009.01) |
| H04L 12/28 | (2006.01) |
| H04L 12/56 | (2006.01) |
| H04J 3/26 | (2006.01) |
| H04N 5/91 | (2006.01) |
| H04N 7/00 | (2006.01) |
| G06Q 10/00 | (2006.01) |
| G06Q 30/00 | (2006.01) |
| G06F 15/16 | (2006.01) |
| H04N 7/18 | (2006.01) |

(52) U.S. Cl. .................. 455/508; 455/3.02; 455/410; 455/426.1; 370/419; 370/423; 370/432; 386/46; 705/1.1; 705/14.26; 705/26; 709/200; 709/231; 725/81

(58) Field of Classification Search ............... 455/419, 455/463, 464, 517, 556.1, 558, 560, 2.01, 455/13.3, 405, 550.1, 181.1, 466, 3.01–3.06, 455/414.3, 426.1, 452.1, 456.1, 456.6, 457, 455/508, 566, 41.2, 45, 94, 150.1, 150.2, 455/150.3, 154.1, 158.4, 186.1, 403, 404.1, 455/404.2, 406, 410, 412.1, 412.2, 413, 414.1, 455/414.2; 705/1, 7–10, 14, 28, 30–32, 34–35, 705/37, 39, 52, 59, 400, 1.1, 2, 14.1, 14.17, 705/14.26, 14.35, 14.37, 14.38, 14.4, 14.52, 705/14.54, 14.56, 14.61, 14.66, 14.67, 16, 705/26, 27, 51, 319, 321, 323; 707/100; 725/19–20, 34, 37, 41–42, 62, 88, 90, 102, 725/110, 116, 134, 114, 136, 52, 1, 51, 112, 725/81; 709/200, 206, 217, 219, 231, 201, 709/207, 245; 386/46, 125; 370/259, 270, 370/329, 352, 354, 389, 395.21, 396, 397, 370/401, 419, 422.1, 423, 424, 426.1, 432
See application file for complete search history.

(56) References Cited

U.S. PATENT DOCUMENTS

| | | | |
|---|---|---|---|
| 5,727,171 A | 3/1998 | Iachetta, Jr. | |
| 5,751,968 A * | 5/1998 | Cohen | ................ 709/231 |
| 6,002,675 A | 12/1999 | Ben-Michael et al. | |
| 6,578,068 B1 | 6/2003 | Bowman-Amuah | |
| 6,640,248 B1 | 10/2003 | Jorgensen | |
| 6,687,224 B1 | 2/2004 | Ater et al. | |
| 6,725,022 B1 * | 4/2004 | Clayton et al. | ........... 455/154.1 |
| 6,732,179 B1 | 5/2004 | Brown et al. | |
| 6,819,669 B2 * | 11/2004 | Rooney | ................ 370/390 |
| 6,850,965 B2 | 2/2005 | Allen | |
| 6,882,623 B1 | 4/2005 | Goren et al. | |
| 6,976,090 B2 | 12/2005 | Ben-Shaul et al. | |
| 6,982,987 B2 | 1/2006 | Cain | |
| 7,031,254 B2 | 4/2006 | Abraham et al. | |
| 7,031,306 B2 | 4/2006 | Amaral et al. | |
| 7,047,301 B2 | 5/2006 | Skene et al. | |
| 7,058,721 B1 | 6/2006 | Ellison et al. | |
| 7,068,660 B2 | 6/2006 | Suni et al. | |
| 7,085,290 B2 | 8/2006 | Cain et al. | |

| | | | |
|---|---|---|---|
| 7,088,685 B2 * | 8/2006 | Meyerson et al. | 370/260 |
| 7,092,358 B2 | 8/2006 | Ruutu et al. | |
| 7,092,696 B1 | 8/2006 | Hosain et al. | |
| 7,093,001 B2 | 8/2006 | Yang et al. | |
| 7,103,669 B2 | 9/2006 | Apostolopoulos | |
| 7,177,945 B2 | 2/2007 | Hong et al. | |
| 7,190,670 B2 | 3/2007 | Varsa et al. | |
| 7,191,244 B2 | 3/2007 | Jennings et al. | |
| 7,197,557 B1 | 3/2007 | Asar et al. | |
| 7,222,147 B1 | 5/2007 | Black et al. | |
| 7,225,267 B2 | 5/2007 | Key et al. | |
| 7,254,605 B1 | 8/2007 | Strum | |
| 7,254,607 B2 | 8/2007 | Hubbard et al. | |
| 7,260,635 B2 | 8/2007 | Pandya et al. | |
| 7,324,540 B2 | 1/2008 | Vangal et al. | |
| 7,330,635 B2 * | 2/2008 | Fujita | 386/46 |
| 7,330,717 B2 | 2/2008 | Gidron et al. | |
| 7,376,414 B2 * | 5/2008 | Engstrom | 455/414.3 |
| 2002/0073232 A1 | 6/2002 | Hong et al. | |
| 2002/0078158 A1 * | 6/2002 | Brown et al. | 709/206 |
| 2002/0090934 A1 * | 7/2002 | Mitchelmore | 455/412 |
| 2002/0106998 A1 * | 8/2002 | Presley et al. | 455/403 |
| 2002/0107830 A1 | 8/2002 | Nanja | |
| 2002/0146008 A1 | 10/2002 | Kaplan | |
| 2003/0003899 A1 * | 1/2003 | Tashiro et al. | 455/414 |
| 2003/0005455 A1 | 1/2003 | Bowers | |
| 2003/0059039 A1 * | 3/2003 | Meyerson et al. | 379/428.04 |
| 2003/0084184 A1 | 5/2003 | Eggleston et al. | |
| 2003/0093515 A1 | 5/2003 | Kauffman | |
| 2003/0093530 A1 | 5/2003 | Syed | |
| 2003/0134645 A1 * | 7/2003 | Stern et al. | 455/456 |
| 2004/0008688 A1 | 1/2004 | Matsubara et al. | |
| 2004/0030797 A1 | 2/2004 | Akinlar et al. | |
| 2004/0034723 A1 * | 2/2004 | Giroti | 710/8 |
| 2004/0071145 A1 | 4/2004 | Ha et al. | |
| 2004/0073693 A1 * | 4/2004 | Slater et al. | 709/231 |
| 2004/0090943 A1 | 5/2004 | da Costa et al. | |
| 2004/0128342 A1 * | 7/2004 | Maes et al. | 709/200 |
| 2004/0158855 A1 * | 8/2004 | Gu et al. | 725/39 |
| 2004/0176085 A1 | 9/2004 | Phillips et al. | |
| 2004/0199635 A1 | 10/2004 | Ta et al. | |
| 2005/0177633 A1 | 8/2005 | Plunkett | |
| 2005/0188406 A1 * | 8/2005 | Gielow et al. | 725/81 |
| 2007/0055615 A1 | 3/2007 | Howell et al. | |
| 2007/0094086 A1 | 4/2007 | Ikezawa et al. | |

OTHER PUBLICATIONS

Almajano, Luis et al., "Packet Scheduling Algorithms for Interactive and Streaming Services Under QoS Gaurantee in a CDMA System", Proceedings 56th IEEE Vehicular Technology Conference, vol. 3, 2002-Fall, dated Aug. 27, 2007, pp. 1657-1661.

Sevanto, Jarkko, et al. "Introducing Quality-of-Service and Traffic Classes into Wireless Mobile Networks," Proceedings 1st ACM International Workshop on Wireless Mobile Multimedia, 1998, pp. 21-29.

Chao, His-Lu and Liao, Wanijun. "Credit-Based Slot Allocation for Multimedia Mobile Ad Hoc Networks," IEEE Journal on Selected Areas in Communications, vol. 21, Issue 10, Dec. 2003, pp. 1642-1651.

Hamer, L.N. et al. "Framework for Session Set-up with Media Authorization," RFC 3521, Apr. 2003, pp. 1-25.

Zseby, T. et al. "Policy-Based Accounting," RFC 3334, Oct. 2002, pp. 1-44.

Camarillo, G. et al. "Integration of Resource Management and Session Initiation Protocol (SIP)," RFC 3312, Oct. 2002, pp. 1-30.

Snir, Y. et al. "Policy Quality of Service (QoS) Information Model," RFC 3644, Nov. 2003, pp. 1-73.

Moore, B. et al. "Information Model for Describing Network Device QoS Datapath Mechanisms," RFC 3670, Jan. 2004, pp. 1-97.

Chaskar, H. "Requirements of a Quality of Service (QoS) Solution for Mobile IP," RFC 3583, Sep. 2003, pp. 1-10.

* cited by examiner

*Primary Examiner*—Nay A Maung
*Assistant Examiner*—Paul P Tran
(74) *Attorney, Agent, or Firm*—Kilpatrick Stockton LLP

(57) ABSTRACT

A system and method is described for providing an interactive rich media information service to users of mobile devices. The rich media information is presented to users in a plurality of interactive rich media channels. A subscriber-specific data stream is received at the mobile device containing channel data for each of the rich media channel that the user has subscribed to. The channel data is separated and stored corresponding to each such subscribed-to channel. An interactive multimedia runtime container (iMRC). is executed on the mobile device for each subscribed-to channel. The rich media channels are played on the iMRC and displayed on the display of the mobile device. Using the user interface elements of the mobile device, the user may navigate through the information on the channels, navigate between different channels, subscribe or un-subscribe to channels, and enter user preferences for further tailoring the information presented in the subscribed-to channels.

20 Claims, 6 Drawing Sheets

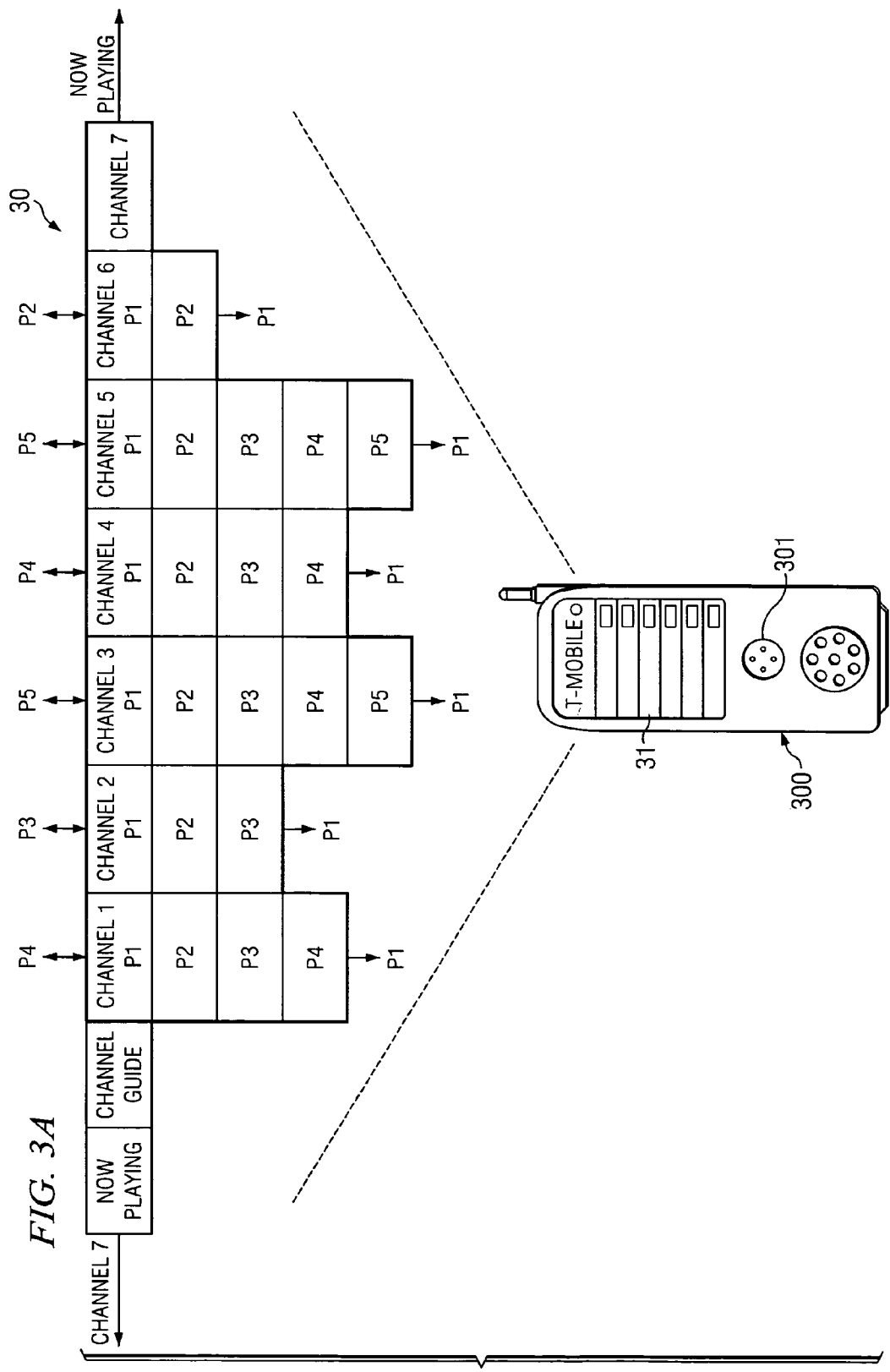

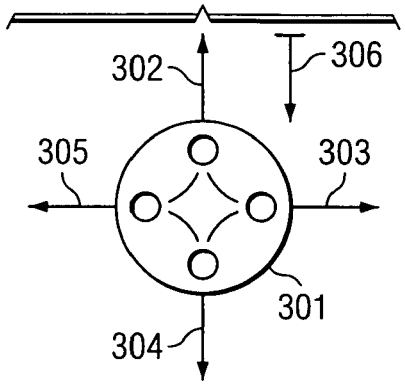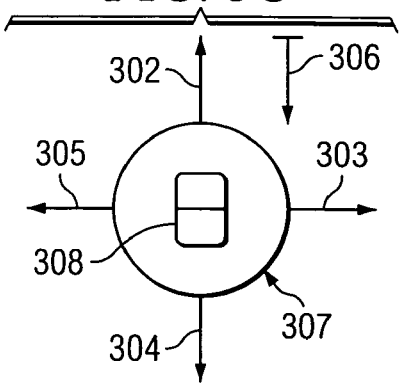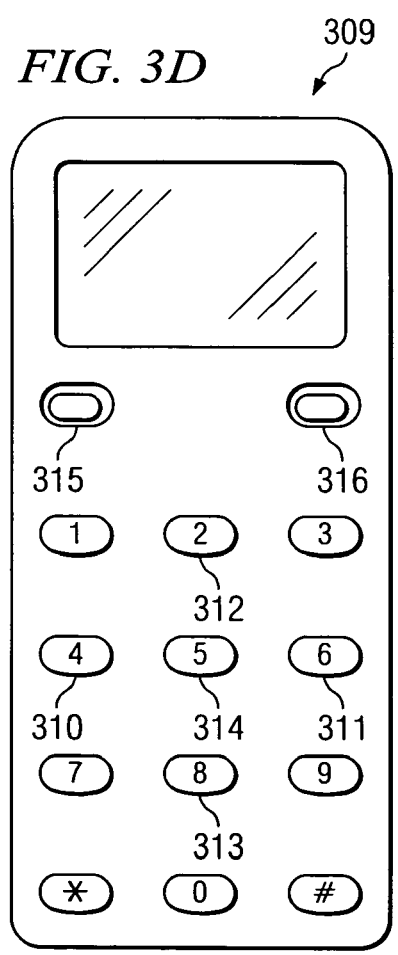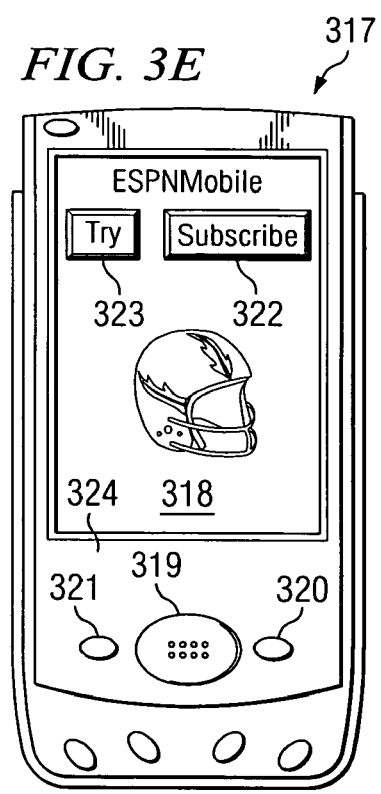

MOBILE RICH MEDIA INFORMATION SYSTEM

CROSS REFERENCE TO RELATED APPLICATIONS

Figure 1:
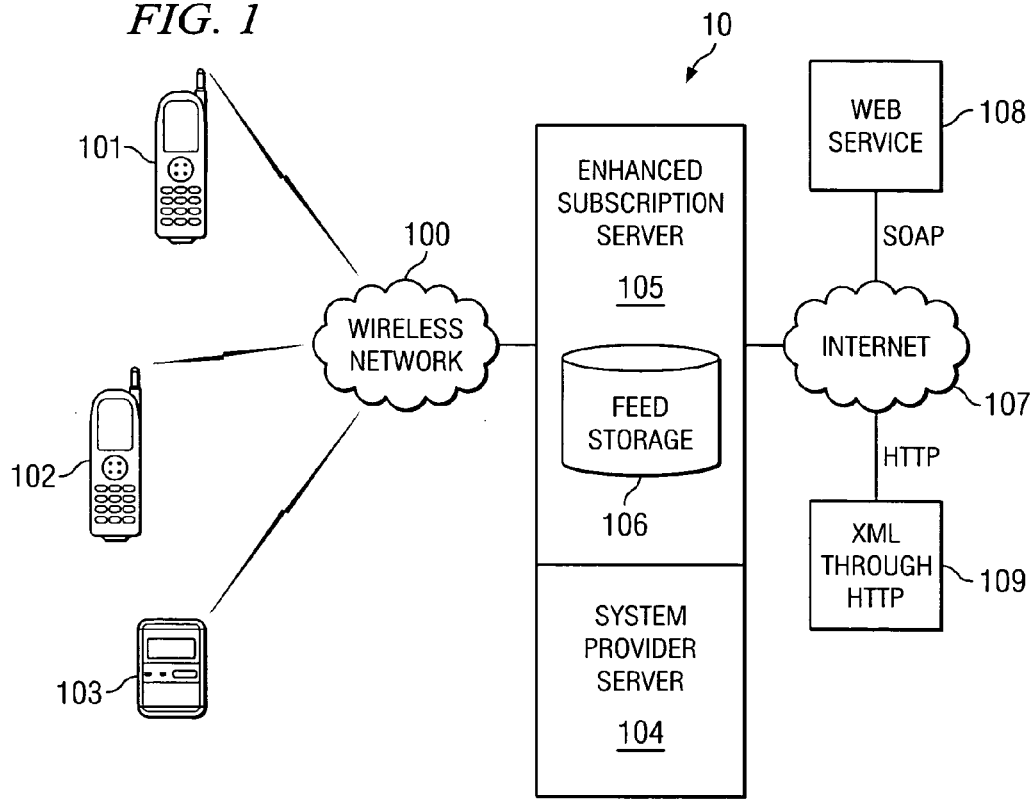

The present application is related to concurrently filed, co-pending, and commonly assigned U.S. patent application Ser. No. 10/791,299 entitled "SYSTEM AND METHOD FOR DELIVERING INFORMATION FOR A WIRELESS INFORMATION SYSTEM"; and U.S. Pat. No. 7,478,148, entitled "BANDWIDTH MANAGEMENT SYSTEM," the disclosures of which are hereby incorporated by reference.

TECHNICAL FIELD

The present invention relates, in general, to electronic information systems, and, more specifically, to a mobile rich media information system.

BACKGROUND OF THE INVENTION

With the increase in wireless technologies, the computer world of a decade ago is quickly evolving into a wireless world. Beginning with the explosion of the wireless phone, people have become more mobile, but, at the same time, becoming less isolated when in motion. Short-range wireless business networks and public Hotspots allow users to access the Internet from a wireless-equipped personal data assistant (PDA) or laptop. Even before the prevalence of these short-range wireless networks, information exchange had been implemented using wireless telephone technology. Because of the near ubiquity of cellular phones, the mobile phone network would seem to be the perfect medium for providing information wirelessly. However, because of the limited nature of wireless phones and the data handling capabilities of wireless telecommunication networks, the resulting information systems have not achieved much popularity with consumers.

One of the major reasons that the wireless phone-based information systems have not enjoyed the same success as the short-range wireless networks is likely due to the overall user experience. Of course, the user experience is largely driven by the available bandwidth in the network, but the users, who actually subscribe to and pay for these services generally do not care what the bandwidth availability is, just as long as the user experience is satisfying.

One of the first technologies that was used to pass information to a wireless phone user was Small Message Service (SMS). SMS is a text service that enables short messages of generally no more than 140-160 characters in length to be sent and transmitted from a mobile phone. In such a system, a user would typically log onto a particular Web site or sign up through some interactive telecommunications service to receive periodic small messages of interest. For example, a user could call into a service provider and sign up to receive the sports scores for their favorite basketball team or teams. Thereafter, when the service provider compiles the scores for the basketball games, a short text message would be forwarded to the user's mobile phone, or whatever other mobile device that was designated. The only interaction by the user is typically on the initial set-up of the service, whether that set-up occurred using an Internet-connected computer, via telephone, or the like. SMS allowed for the user to receive information; however, because the system was so limited in message-length and restricted to text, the user experience was typically dull.

The next step in wireless information technology was largely driven by the explosion of the World Wide Web. Web browsers, which are so prevalent in everyday life, were scaled down for use in mobile phones. The microbrowser provides browser-like functionality to the mobile phone, albeit at a much reduced level. Due to the limited memory and processing power of mobile phones, early microbrowsers used Wireless Access Protocol (WAP) and Wireless Mark-up Language (WML), which attempted to mimic the full-scale standards of hypertext transfer protocol (HTTP) and hypertext mark-up language (HTML). More recently, as the ability of the mobile phones has increased, some microbrowsers actually use HTML browsers.

The paradigm of the microbrowser operates in much the same manner as a full-scaled Web browser. A Web page, which may be a WAP page or an HTML page, is downloaded from a Web server, again, which could be a WAP server or HTTP server, to a user's phone. Either by activating standard navigation elements or hypertext links, subsequent Web pages are downloaded to the microbrowser for the user to view. The user's interaction is similar to that in a Web browser except without the graphical richness. The user can hit forward or back or, through some substantial key-strokes, enter a Web site address. Because of the device and bandwidth restrictions in the mobile telecommunication area, the main noticeable difference between the microbrowser paradigm and the Web browser is that the majority of information on the "micro" pages is textual.

In application, the microbrowser offered a greater variety and reach of information than the SMS systems. Moreover, the user is afforded a greater interactivity by being allowed to "surf" to any desired and compatible Web site or Web page. However, in operation, the user experience could be described as click-and-wait, rather than click-and-view. Because of both the slowness of the roundtrip transmission of a user interaction on the phone to a central server and the subsequent return of the data to that phone in combination with a relatively large amount of data is transmitted over the wireless network to the phone for each Web page, a large latency existed between the page request and the final download and display of the page. Latency is also affected by data disconnects that occur due to things such as the hand-offs of the mobile device between mobile towers and other such network disconnects, such as when a user drives through tunnels, and the like. This large latency period experienced by most wireless phone Internet users limited the appeal of the microbrowser system. Furthermore, because many service providers placed a per minute usage charge on accessing the Internet over a mobile phone, the long latency generally meant higher costs for a service where the waiting time could exceed the actual information interaction time.

Several ideas followed the microbrowser attempting to address the problems it exhibited. One solution that addressed the long latency periods and lack of graphical experience was the stored-page approach. Instead of receiving information over the wireless telephone network, the user connects a device to a computer with an Internet connection. Based on site preferences that a user may have set up, the Web pages for any particular Web site are downloaded into the memory of the mobile phone or device. Once disconnected from the computer, the user may browse and navigate through the downloaded pages without any latency. Furthermore, because there are no wireless bandwidth considerations, the content presented may be more graphically oriented.

An example of this type of service is iAnywhere Solutions, Inc.'s AVANTGO™. However, the trade-off made for the low latency is the fact that the data being viewed is no longer dynamic Web content. The AVANTGO™ methodology simply stores the pages on a device. Those pages remain the same until the user can again connect to the Internet to retrieve updates.

One improvement, which was applied to the microbrowser paradigm, is generally referred to as a push browser service. Instead of waiting for a user to request a particular Web page, the push browser is proactively sent an HTML or WML page from the server. Therefore, when a user accesses the microbrowser, at least some content is already resident on the device, which initially reduces the latency. The user's interaction remains the same as the regular microbrowser, which basically mimics the user interaction of Web browsers without the rich graphics. The limitation to the push browser is that only a limited number of HTML/WML pages are stored. Once the user navigates or browses through all of the stored pages, the advantages achieved by the push system are gone. Without the stored pages, new pages are generally downloaded from the Web server on request of the user, which results in the long latency periods experienced in the normal microbrowsers.

An addition to the push technology was attempted in POINTCAST INC.'s POINTCAST system. The POINTCAST system was an information system on a desktop computer which compiled and broadcast a wide variety of information items. Subscribers to this system would receive the broadcasts and store the information items locally. By entering preferences to the user's local system, the client-side application of POINTCAST would filter the presentation of the information to the user based on those user preferences. The POINTCAST server would periodically update the information items, which the user could then view if those updates corresponded to the items the user preferred to view. However, the bandwidth requirements for transmitting and receiving all of the information typically clogged networks and caused long periods of network latency. Users would typically experience slow network access and much-decreased available bandwidth for other interactions.

SUMMARY OF THE INVENTION

Representative embodiments of the present invention are directed to a system and method for providing a mobile information system. The mobile information system offers a number of different information channels for subscriptions to mobile device users. The users may view the different channels available for subscription and select desired ones for subscription. An enhanced subscription server maintains subscription information for each subscribing user and, using this information, generates a subscriber-specific stream of data to be transmitted to the user/subscriber. The subscriber's mobile device receives this stream of data that includes the data available to populate the different channels to which the user has subscribed.

The user's mobile device activates an interactive multimedia runtime container that may run a channel application corresponding to the visual experience of the particular channel. The channel data received in the data stream is then used to populate the information for the channel application. As a result, the user is able to view an interactive, rich media presentation of the information on the subscribed-to channel. By using available navigation instruments on the user's mobile device, the user is allowed to navigate through the contents of the displayed channel, or navigate to different channels.

In the typical operation, incoming channel data provides updates or changes to the channel, as opposed to providing a complete data change for every channel. Transmitting only the updates or changes conserves bandwidth, while still maintaining the rich information on each channel. There may be instances in which all of the data for a particular channel is changed or, at least, substantial portions. However, in most normal operations, only the channel data representing the changes or updates to the channel information will be sent.

Additional embodiments of the present invention are directed to a method for experiencing interactive multimedia information on a mobile unit comprising interacting with a user interface of the mobile unit to subscribe to one or more channels having interactive multimedia content, manipulating a navigational mechanism on the mobile unit to explore the interactive multimedia content on one of the one or more channels, interacting with the user interface of the mobile unit to enter preferences applicable to the one or more channels subscribed to, and automatically receiving content updates for the one or more channels subscribed to.

DETAILED DESCRIPTION OF THE INVENTION

FIG. 1 is a block diagram illustrating one embodiment of the present invention. Wireless network 100 includes a number of subscribing mobile units or devices, such as mobile devices 101-103. Communication with any of mobile devices 101-103 is generally implemented through mobile network 100 and system provider server 104. In the example illustrated in FIG. 1, the system provider operating mobile network 100 or some third-party operating in conjunction with the system provider may offer a rich media information service having multiple information channels to each of it subscribers. Subscribers to the information service may subscribe individually to select certain channels that present information of interest. For purposes of FIG. 1, mobile devices 101-103 each subscribe to several different channels of this rich multi-media information service.

In order to implement the rich media information service, enhanced subscription server 105 operates in conjunction with system provider server 104. Enhanced subscription server 105 compiles a subscriber-specific stream of information that contains the information for each individual channel to which the subscriber has subscribed. Therefore, each of mobile devices 101-103 will receive an individual data stream from enhanced subscription server 105 that will facilitate the presentation of the information service on each device. The data stream from enhanced subscription server 105 may be transmitted to each of mobile devices 101-103 in any number of data protocols, such as HTTP, SMS, User Datagram Protocol (UDP), or the like.

Enhanced subscription server 105 compiles the stream of information from feed storage 106, which stores the information and data associated with each channel offered in the rich media information service. This information is typically obtained from third party information providers over Internet 107 through various means, such as Web service 108, Extensible Markup Language (XML) 109 communicated over HTTP, and the like. By accessing system provider server 104, enhanced subscription server 105 authenticates user access to the rich media information service and may also obtain the subscriber information for mobile devices 101-103 to determine which channels may be included in the data streams. Once that information is obtained, enhanced subscription server 105 may compile a data stream for mobile device 101 that includes channel data from feed storage 106 for each channel that the user of mobile device 101 subscribes to. Similarly, enhanced subscription server 105 may compile subscriber specific individual data streams for mobile devices 102 and 103 that includes channel data for updating each rich media channel that the users of mobile devices 102 and 103 subscribe to. As the feed data streams are compiled, enhanced subscription server 105 sends those streams to the destination mobile device over wireless network 100.

It should be noted that various methods for controlling the transmission of information streams to and from a client of a the rich media information system may be employed. One example system, is described in commonly-owned, concurrently-filed Patent Application, entitled BANDWIDTH MANAGEMENT SYSTEM, U.S. Pat. No. 7,478,158, the disclosure of which is incorporated herein.

In further operation of the rich media information service, the users at mobile devices 101-103 may send preferences, settings, or even subscribe to new channels by interacting with the rich media presentation of the information through user interface application running on mobile devices 101-103. For example, if a channel subscribed to by the user of mobile device 101 provides stock quotes, the user may indicate the specific stocks that he or she wants to receive quotes on. This information is then transmitted back to enhanced subscription server 105 through wireless network 100 and noted in the subscription information for the user of mobile device 101.

Additionally, each mobile device, such as mobile devices 101-103, may include an application that displays all of the available channels that are being offered by the rich media information service to that device, as determined by the rich media information service, based on the constraints of the user's device hardware and software. By interacting with this channel listing, the user may subscribe to additional available channels. The user's selections are then transmitted from the subscribing mobile device to enhanced subscription server 105 through wireless network 100 and noted in the subscription information for that subscribing user device. The subscribers may, therefore, manage their subscriptions, as well as, interact with the rich media channel presentations directly from the mobile device.

Figure 2:
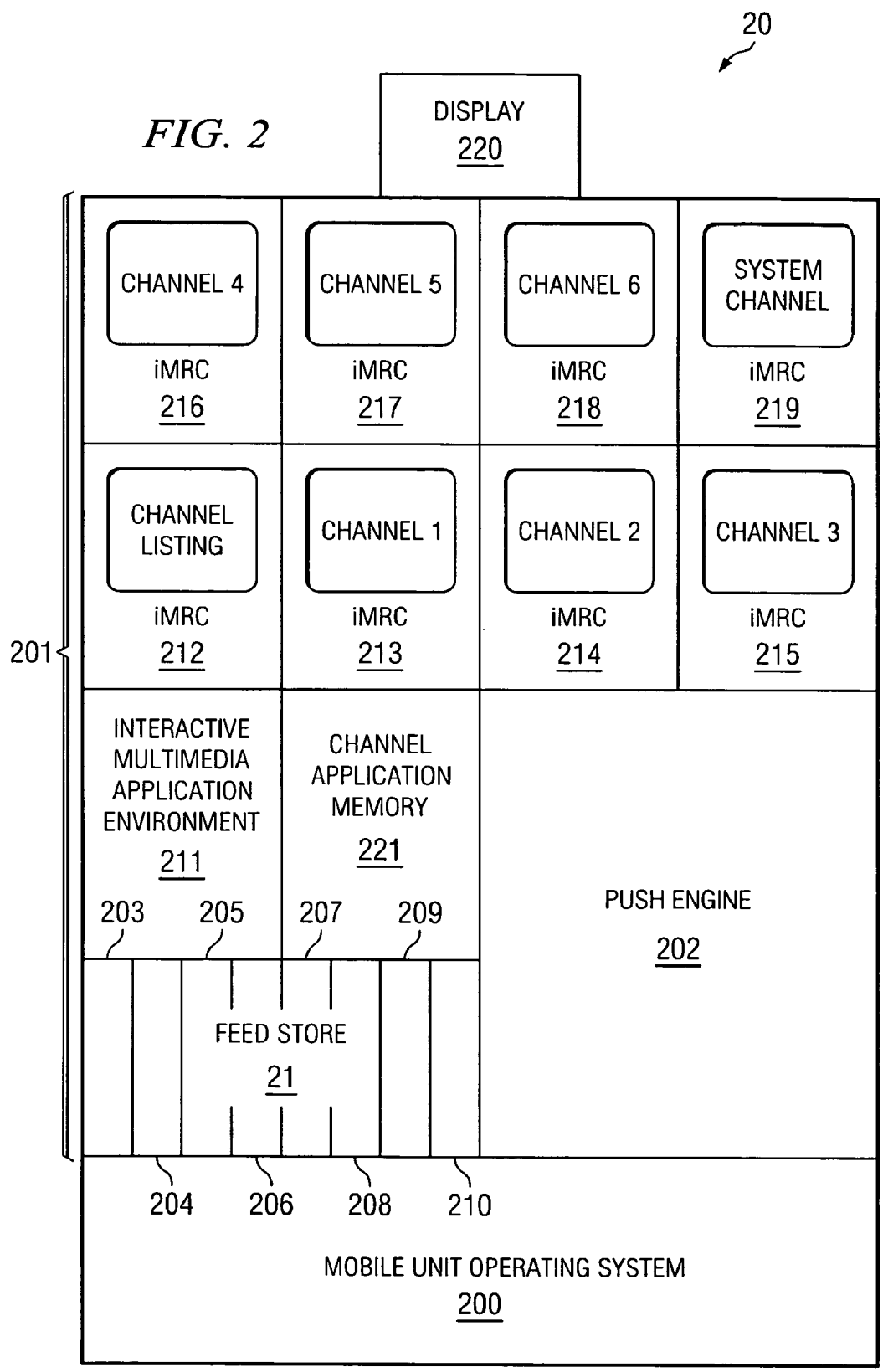

FIG. 2 is a block diagram illustrating a conceptualized portion of mobile unit 20. Because most mobile devices include computers to operate their functionality, an operating system is included to act as the master control program controlling the basic functionalities of the device. Examples of existing mobile operating systems are SYMBIAN LTD.'S SYMBIAN OS™, MICROSOFT CORPORATION'S WINDOWS CE™, QUALCOMM CORPORATION's BREW™, and the like. Mobile unit 20 includes Mobile Unit Operating System 200 (MUOS). Operating on top of MUOS 200 is rich media client application 201. Client application 201 includes various parts, such as push engine 202, feed store 21, which is the storage location for the information making up each channel, and the like. Storage blocks 203-210 within feed store 21 each correspond to a channel that the user of mobile unit 20 subscribes to. Channel application memory 221 is the memory location for the operating visual elements used in presenting the channel to the user.

Interactive multimedia application environment (iMAE) 211 is a resident application for running the channel applications and integrating the channel data stored in which every one of storage blocks 203-210 that is associated with the channel being presented. An iMAE may be a multimedia presentation application that includes capabilities for displaying graphics, video, animation, audio, and the like. A preferred embodiment may utilize vector graphics in order to take advantage of the size benefits that accompany such applications. One example of such an iMAE are the different versions of MACROMEDIA, INC.'S MACROMEDIA FLASH™. When the rich media information system is operating on mobile unit 20, iMAE 211 starts an interactive multimedia runtime container (iMRC) for each channel that is to be displayed to the user on display 220. An iMRC is the actual runtime container for running or displaying the visual presentation. One example of such an iMRC are the different versions of MACROMEDIA, INC.'S MACROMEDIA FLASH PLAYER™. In the example shown in FIG. 2, the user of mobile unit 20 subscribes to seven channels, Channel 1-7. On operation of the information service, iMAE 211 opens iMRC 213-218, in which the channel applications for each of Channels 1-6 are run using the feed data stored in storage blocks 203-210 that are associated with each individual channel. Moreover, iMAE 211 opens iMRC 212 and 219 to display system channels, such as Channel Listing. Other system channels may comprise information, such as a headlines channel, a channel listing promotional channels offered for subscription, interactive game channels, or any various other information channels.

The feed or channel data associated with any one or a number of channels typically remains stored in feed store 21 until newer or updated data arrives to replace some or, eventually, all of it. The channel application running in an iMRC draws its data exclusively from the associated storage block of feed store 21, such that the channel being presented on the iMRC typically does not have to wait for data to be received from enhanced subscription server 105 (FIG. 1). Furthermore, a particular channel application will typically only have access rights to access the specific storage block assigned for that channel.

In addition to presenting information in each of the rich or multi-media channels presented in the iMRCs, because many embodiments of the present invention will be implemented on mobile devices that include telephone functionality, the rich media channels may include user-accessible features that are integrated with the telephone functionality of the mobile device. In such embodiments, the user may select an item shown on the rich media channel, which would then activate the telephone features to call a certain number. Such a selection on the rich media channel may even send an SMS message or open a microbrowser on the mobile device.

As mobile unit 20 receives a data stream from enhanced subscription server 105 (FIG. 1), push engine 202 analyzes or parses the stream separating the data chunks for Channel 1 from the data chunks for Channel 2, and so forth, and then stores the data chunks in the appropriate storage block of feed store 21. All of the data that makes up the complete display of the channels, such as Channel 1 or Channel 2 are stored in feed store 21. The data chunks on the data stream represent only portions of the total data making up the channels. In some operations, these portions represent only the updates for the particular channels, while in other operations, the entire channel or a large part thereof may be replaced. Because of the operation of iMAE 211 and the iMRCs, when new data is provided, the channel being displayed on the iMRC is automatically updated without need to refresh the display, as would be required in an HTML document or the like. Therefore, the information being displayed in the channels may update as they are being displayed to the user on display 220.

FIG. 3A is an illustration of one embodiment of the present invention operating on mobile phone 300. Subscription lineup 30 comprise the channels subscribed to by the user of mobile phone 300, Channel 1-7, Channel Listing, and Now Playing. Subscription lineup 30 is displayed, typically one page at a time, on display 31 of mobile phone 300. A user would manipulate 5-way button 301 in order to navigate through the different channels and pages of subscription lineup 30. Using such a 5-way button, the user may navigate subscription lineup 30 easily and, perhaps, by using one-hand.

It should be noted that while subscription lineup 30 shown in FIG. 3A includes both Channel Listing channel, which presents available channels for subscription to the user, and Now Playing channel, which gives a one-page view of each of the channels subscribed to by the user, various embodiments of the present invention may include only Channel Listing or neither.

In order to facilitate navigation, subscription lineup 30 may be oriented to accommodate the limited navigation means of mobile devices. In the example shown in FIG. 3A, each channel is associated at its first page, i.e., page 1. Thus, the user may navigate from channel-to-channel using a side-to-side or left-to-right/right-to-left motion on S-way button 301. For example, when a user navigates to Channel 7, p. 1, he or she views the contents of Channel 7. If the user were to press right on 5-way button 301, Now Playing channel would be shown on display 31. Similarly, if the user were to press left, Channel 6, p. 1 would be shown on display 31. When the user navigates to the desired channel, the page-contents of that channel may be navigated in an up-down motion on 5-way button 301. For example, when a user navigates to Channel 1, p. 1, he or she may view the contents of Channel 1 by pressing S-way button 301 up or down. If the user were to press up, p. 4 would be shown on display 31. Similarly, if the user were to press down, p. 2 would be shown on display 31.

The channels of subscription lineup 30 shown in FIG. 3A are associated only at p. 1 of the channel. Therefore, if a user were viewing a page within the desired chapter, the user may not navigate to other channels merely by using a side-to-side or left-to-right/right-to-left motion on 5-way button 301. The user would either have to return to the first page of the channel, or jump, in someway, to another first page of a channel. Additional and alternative embodiments of the present invention may be configured such that a user may be capable of navigating to different channels from within the pages of a channel being viewed simply by executing a side-to-side navigation motion.

It should be noted that while the example embodiment illustrated in FIG. 3A incorporates a channel structure in which each channel is associated on a side-to-side basis, where channel content is associated on an up-down basis, other structures may be used in additional or alternative embodiments of the present invention. For example, channels may be associated on an up-down basis, while the channel content is associated on a side-to-side basis. Moreover, in additional and alternative embodiments may provide a default view that cycles through the first page of each subscribed-to channel in a carousel-like manner. Thus, by glancing down at his or her mobile device, the user would view the cycle of the first pages of each channel. By activating a button-click on any one of the cycling channels, including a system channel such as the channel listing channel, the user would stop the cycling and have full access to the selected channel.

FIGS. 3B-3E are illustrations showing examples of different navigation elements available on mobile devices. FIG. 3B is a close-up view of 5-way button 301 from FIG. 3A. 5-way button 301 operates on a 5-way rocker switch to allow a user directional control by depressing button 301 in either north 302-south 304 or east 303-west 305 directions. The fifth direction is accomplished by depressing 5-way button 301 directly down in button-click direction 306. Button-click direction 306 may be used to augment the directional navigation functionality of various embodiments of the present invention by activating some kind of event or making a selection. FIG. 3C is an illustration showing joystick 307. As shown, joystick 307 also allows directional movement in 5 different ways, north 302-south 304 or east 303-west 305 or button-click 306.

In alternative embodiments, a single, 5-way button or joystick may be unnecessary or unavailable. FIG. 3D is an illustration showing mobile phone 309. Instead of having a 5-way button or joystick, soft keys are made available for navigation on mobile phone 309. Soft keys are existing keys or buttons that may be assigned different functions or features depending on the current state of the mobile phone. For example, in order to make directional navigation available to a user of mobile phone 309 (FIGS. 3B and 3C), for north 302-south 304 or east 303-west 305 or button-click 306, 4-key 310 may be assigned a soft key function for effecting west 305, similarly, 6-key 311 may be assigned east 303, 2-key 312 may be assigned north 302, 8-key 313 may be assigned south 304, and 5-key 314 may be assigned button-click 306. By assigning such directional functions to existing keys, a user having a phone without a 5-way button or joystick may still take advantage of the multimedia information system. Another key on mobile phone 309 may also be assigned a Shift function, such that if a user were required to enter information at a subscription page or a properties page, the navigational functions of the soft keys 310-314 may be temporarily deactivated.

FIG. 3E is an illustration showing mobile phone 317. Instead of having a 5-way button or joystick or even standard telephone buttons, mobile phone 317 is configured with touch screen 318 for facilitating interaction with a user. The visual presentation of each channel in the rich media information service is displayed on touch screen 318 in addition to touch sensitive areas assigned for user interaction. For example, soft 5-way button 319 operates in the same manner as a physical element, except that a user may use a stylus, a finger, or other object to touch around soft 5-way button 319 to exercise navigation. Similarly, soft buttons 320 and 321 may be assigned certain functions, such as a Back, Forward, Home, or similar feature, that is also operable through a stylus or other object.

It should be noted that the touch-elements described above, soft 5-way button 319 and soft buttons 320 and 321 are located in specific touch-area 324 that exists in certain styles of touch screen-enabled devices. However, the embodiment shown in FIG. 3E may also facilitate touch elements directly on the display-portion of touch screen 318. A trial channel is shown playing on touch-screen 318. In various embodiments of the present invention, the rich media information system may offer channels to users on a try-before-you-buy basis. In such channels, the content of a channel is provided to mobile device 317 in a manner similar to the user subscribing to the actual channel. As shown in FIG. 3E, soft Try button 323 is located on the display-portion of touch-screen 318. If the user desires to try out the displayed channel prior to actually paying for a full-time subscription, the user would select soft Try button 323 to communicate to the enhanced subscription server to send the channel to mobile device 317. Similarly, some embodiments may then present the user soft Subscribe button 322 to the user for the user to select if he or she desires to pay for the subscription to the channel. The user would select either soft Try button 323 or soft Subscribe button 322 using a finger, stylus, or other object.

It should be noted that the examples of navigational elements, as shown in FIGS. 3B-3E, are merely examples of the types of buttons or switches that may be present on a user's mobile device and used for navigational purposes. The descriptions are not meant to limit such navigational tools to only the elements shown in FIGS. 3B-3E.

Additional embodiments of the present invention may also provide for soft keys to provide basic "browser-like" functions, such as Back, Home, or the like. Referring again to FIG. 3D, soft keys 315 and 316 may be assigned such various functions. Assigning a Back function to soft key 315, for example, would allow a user to go back either to the immediately preceding page, or it could allow the user to go back to the immediately preceding channel, at its first page. Similarly, if a Home function were assigned to soft key 316, for example, the user could jump to the Home page, which could be set either at a specific information channel, or, alternatively, to a Now Playing channel or Channel Listing channel.

It should be noted that although the "browser-like" functions are shown in FIG. 3D, in which mobile phone 309 does not have a 5-way button or joystick, other embodiments of the present invention may also include such soft keys on mobile devices that do include a 5-way button or joystick.

Figure 4:
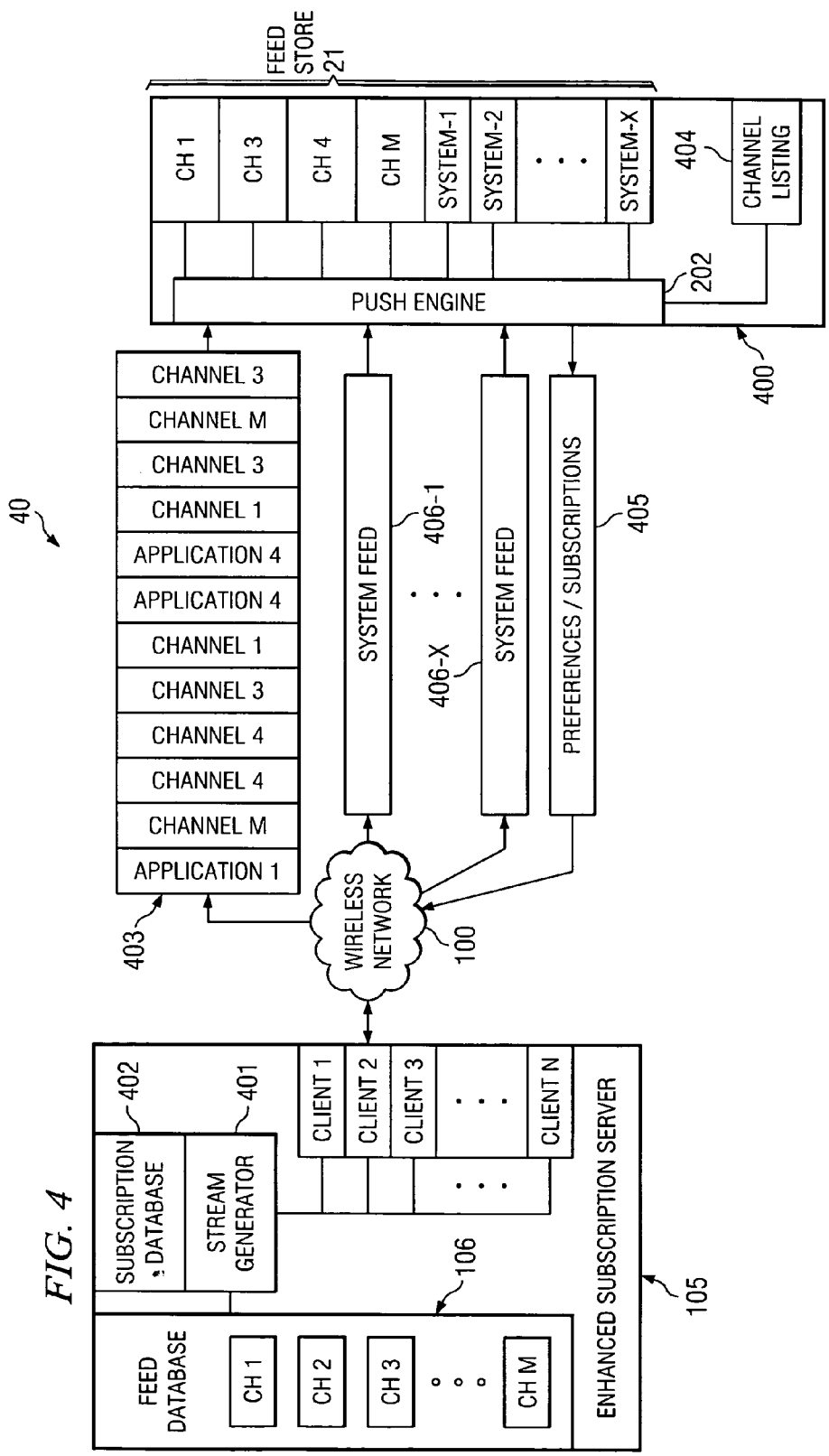

FIG. 4 is a block diagram illustrating rich media information service 40 configured according to one embodiment of the present invention. Enhanced subscription server 105 maintains the current channel data in feed storage 106. At different times, enhanced subscription server 105 will transmit subscriber-specific information streams to the mobile device of the subscriber, such as mobile unit 400, in order to update the channel or feed data present on the mobile device. In this manner, enhanced subscription server 105 pushes the subscriber-specific information to the user's device.

It should be noted that the updating process, in which channel data is pushed to the user's mobile device may be scheduled for any number of different times. For example, update chunks may be transmitted to the mobile device whenever the channel information changes. This direct push may occur at anytime, depending on when channel information changes. A periodic time may also be established such as updating every certain number of seconds, minutes, hours, or other time frame. Additionally, times may be relative, meaning that updates are scheduled a certain amount of time since the last update, or using a time clock, such as every day at noon or whatever time is desired. Furthermore, any combination of any such updating times may be implemented.

When it is time to push new channel data to a subscriber, stream generator 401 accesses subscription database 402 to obtain the specific subscription and preference information for each of the subscribers. Using this detailed information, stream generator 401 compiles a stream of channel data from feed storage 106 and assembles the streams on a per subscriber basis. The subscriber-specific stream is then transmitted over wireless network 100 to the appropriate subscriber. FIG. 4 illustrates the stream for Client 3 being transmitted to mobile unit 400, which would be Client 3's mobile device Stream 403 represents each chunk of channel data and other information used in the implementation of the updates of the channels in rich media information service 40. Stream 403 illustrates data chunks for Channel 1, Channel 3, Channel 4, and Channel M, (i.e., each of the channels that the subscriber has subscribed to). It also includes chunks labeled App 1-4. App 1-4 represent data chunks for certain channel applications. Each channel that is displayed to a user on an iMRC comprises two parts: (1) a channel application, that provides the multimedia, visual presentation of the channel; and (2) the channel data, which is used by the channel application to display, not only the visual aspects of the channel, but the information that the channel presents.

Channel applications reside on the mobile device. In some embodiments, the channel applications may come already installed on the mobile device, while in other embodiments, the channel applications are downloaded through data streams, such as stream 403, along with the actual channel data. Periodically, the service provider may desire to update or change some graphical aspect or presentation of the channel application. Additionally, as a user subscribes to new channels, the new channel applications that facilitate the rich media presentation of the new channel may be downloaded to the subscriber's mobile device. These changes or additions may be effected through the transmission of application data chunks, such as App 1-4 of stream 403. However, because the visual formatting of each existing channel may not change as much as the information that the channels present, application data may be transmitted less frequently.

It should be noted that information updates of the channel data may continue to the user's mobile device whether or not the client-side application of the rich media information service is activated. Therefore, when a user calls up the client-side application, all of the information for the various, subscribed-to channels will be updated with any channel data that was transmitted during the period in which the client-side application was deactivated.

The downloaded channel data also resides on the mobile device, but is typically stored in a separate location. In general, the channel data received by the enhanced subscription server from its data source provider comprises of some kind of data-descriptive metalanguage, such as extensible markup language (XML) or the like. This data is then converted into a form compatible with both the enhanced subscription server and the client-side application. Such a format could be in a binary form or could be some descriptor information that is compressed into a smaller space than the original XML document.

Turning again to FIG. 4, as stream 403 is received at mobile unit 400, push engine 202 parses through stream 403 separating the channel and application data from the stream and placing it in storage associated with its specific channel or application. Push engine 202 is shown separating the channel data chunks into the specific storage blocs of feed store 21 associated with Channel 1, Channel 3, Channel 4, and Channel M.

It should be noted that various implementations of version control may be employed to ensure that the channel updates in stream 403 are appropriate for the target client. In one embodiment, a monotonically increasing stamp may be assigned to various different chronological updates to the channels. As the user's mobile devices sends its polling signal, authentication signal, or identification signal, it also sends its version number of the channel data that it maintains. If the updates at the enhanced subscription server are later than this version number, the enhanced subscription server will send each of the updates that represent versions from the client's version number to the most recent version on the server. Additional or alternative embodiments of the present invention may include clocks within each of the clients and enhanced subscription servers that may be synchronized. In this application, an actual timestamp may be used to define a "fresh until" or "delete after" system in which the client drops the data after a certain time, or an actual chronological time comparison between the timestamp on the client and the synchronized clock on the enhanced subscription server. Other various and additional version control systems may also be used to control the updating process.

One of the features of various embodiments of the present invention is the ability for the rich media service provider to provide system information to the user. Such system information may comprise information on available channels for subscription, promotional channels, information on the various subscriptions that the user has subscribed to, or other such information. In the example illustrated in FIG. 4, system feeds 406-1-406-X are shown being transmitted by enhanced subscription server 105 to mobile unit 400 over wireless network 100. When system feeds 406-1-406-X are received at mobile device 400, push engine 202 directs the system information directly to the system memory locations in feed store 21, system-1, system-2, and system-X. Channel listing 404 may tap directly into the line between push engine 202 and feed store 21 to retrieve the information and channel data used in Channel listing 404.

In operation with Channel Listing 404, the user may interact with Channel Listing 404 to select additional channels to subscribe to. Additionally, each channel may additionally have a properties interface that would allow the user to set particular preferences for each individual channel. The information that the user enters related either to the preferences or new subscriptions may then be packaged into a data stream, Preferences/Subscription stream 405, by push engine 202, or other such communication engine that handles client transmissions, and transmitted to enhanced subscription server 105. Enhanced subscription server 105 may then note the new user preference information and subscription information in subscription database 402 for future compilation of data streams.

Figure 5:
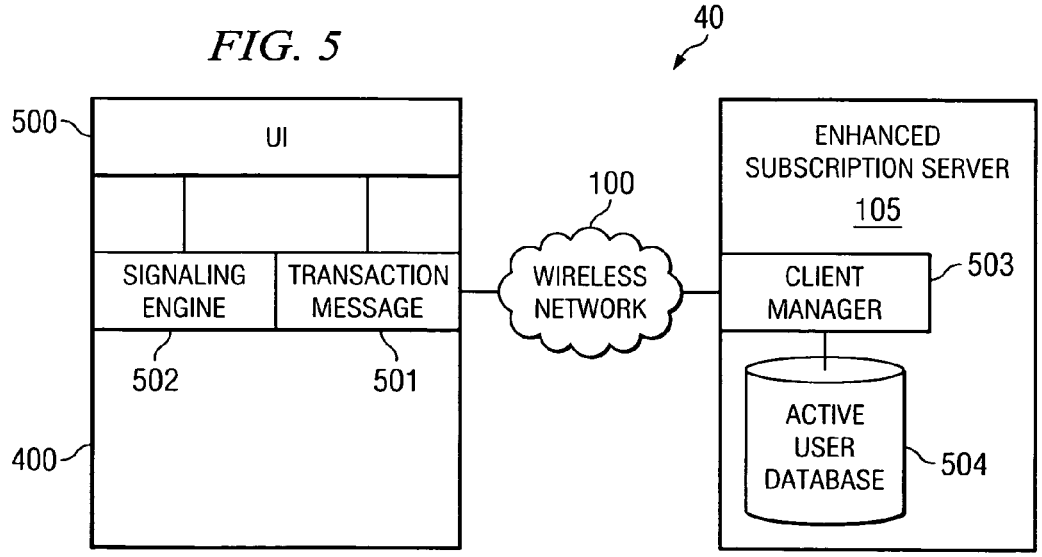

FIG. 5 is a block diagram illustrating an additional aspect of rich media information service 40 configured according to one embodiment of the present invention. The nature of wireless networks is such that mobile devices are generally not always connected to a wireless network, such as wireless network 100. Because the channel data resides within mobile device 400, a user may access the different, subscribed-to channels even without having a connection to wireless network 100. However, when a user desires to enter a preference or add or subtract subscriptions, the user enters these requests immediately using user interface (UI) 500. Each request entered by the user is stored in transaction manager 501. If a connection with wireless network 100 exists, the request is immediately transmitted to client manager 503 on enhanced subscription server 105. The updated information is then recorded in active user database 504 and associated with that particular user.

If the user enters a transaction request when a connection to wireless network 100 does not exist, transaction manager 501 stores the requests until such time as the connection is established. Once established, transaction manager 501 transparently transmits the user request to enhanced subscription server 105 for update.

Signaling engine 502 within mobile unit 400 acts much like a transponder waiting for a signal from enhanced subscription server 105. Periodically, enhanced subscription server 105 may send a signal to mobile unit 400. A signal may be sent if there is pertinent information that the service provider desires to provide to the subscribers or other such information. When the signal from enhanced subscription server 105 is received by signaling engine 502, mobile unit 400 transmits a signal package to enhanced subscription server 105. The signal package may include information, such as the identity of the subscriber or of the mobile unit that corresponds to the subscriber, the last time that the client was updated (or other versioning information), and other similar information. Enhanced subscription server 105 may then use the signal package to find the subscriber-specific details in active user database 504. Using those details, updated channel data and channel application data may be compiled into the subscriber-specific data streams for transmission to the specific subscribers.

In addition to obtaining information based on an initial signal sent from enhanced subscription server 105, rich media information system 40 may also transmit the channel data to the subscribing clients after a polling signal is initiated from the mobile device, such as mobile unit 400. A polling signal, which may be generated by transaction manager 501, signals enhanced subscription server 105 with an identifying signal package. Using the information in the transmitted signal package, enhanced subscription server 105 generates the subscriber-specific data stream for transmission back to mobile unit 400. Thus, enhanced subscription server 105 may push data for delivering rich media information to mobile unit 400 either through a signal initiated by enhanced subscription server 105 or a signal initiated by mobile unit 400. The user does not control the request or delivery of the information beyond merely setting preferences or subscribing to particular rich media channels.

It should be noted that while the user does not control the actual delivery of updated information, additional or alternative embodiments of the present invention may allow the user to set the polling period for polling signals originating from mobile unit 400. Therefore, the user may have some control over the amount of airtime used with wireless network 100. However, the user still does not control the delivery of the channel data. In still further embodiments, the user may be given a choice of completely turning off the system, in order to completely conserve airtime in desired areas. Completely turning off the system would go beyond merely deactivating the client-side application of the rich media information service. Merely deactivating the client-side application would not generally stop enhanced subscription server 105 from transmitting channel data updates.

Figure 6:
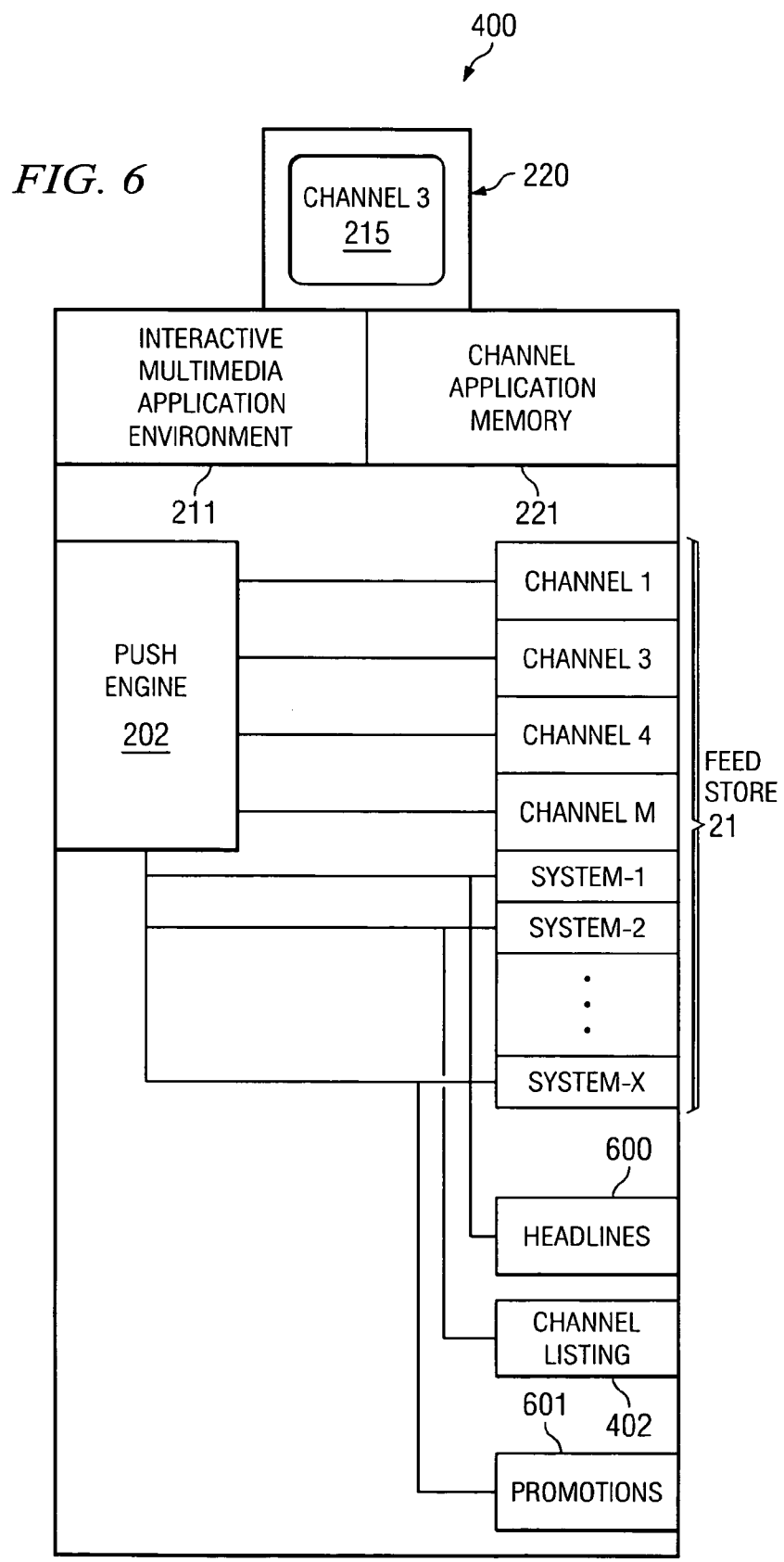

FIG. 6 is a block diagram of mobile unit 400 configured according to an additional embodiment of the present invention. As described in the example depicted in FIG. 4, mobile unit 400 receives a data stream containing channel data for presentation of the rich media channels that the user has subscribed to. Push engine 202 separates the data chunks for the appropriate channels and stores that channel data in corresponding storage blocks of feed store 21. As the channels are displayed on display 220, iMAE 211 begins iMRC 215 using the appropriate channel applications stored in channel application memory 221. IMRC 215 draws the appropriate channel data from the corresponding storage block for completing the rich media appearance of the viewed channel.

In operation, the channel application may only have access rights to the storage block that corresponds directly to that channel. This access restriction maintains the security of the channel data specifically for the particular channel. Similarly, system feeds and the system channel data within such system feeds are protected against access by other non-system channels. However, because system feeds and the system channel applications that use the system feeds originate with the rich media information service, system channel applications, such as headlines 600, promotions 601, and channel listings 402, may access any system feed or any system channel data for purposes of displaying a system channel. For example, while channel listing 402 may directly access channel data for system-2, which is specifically generated for channel listing 402, and promotions channel 601 may directly access channel data for system-X, headlines channel 600 may access channel data for system-1, system-2, and system-X, of which system-1 may contain channel data concerning the subscriptions to which the user subscribes to, in order to generate headlines channel 600.

What is claimed is:

1. A method for experiencing interactive multimedia information on a mobile unit comprising:
   receiving an interaction with a user interface of a mobile unit to subscribe to one or more channels having interactive multimedia content, wherein the mobile unit comprises:
      channel application memory for one or more channel applications that provide information for visually presenting the one or more subscribed-to channels; and
      a feed store for channel data used to populate information for the one or more channel applications, wherein said channel data is stored in channel-specific memory addresses of the feed store, wherein said channel data associated with at least one of the one or more subscribed-to channels is replaced in the feed store when updated channel data arrives to replace it, and wherein access to at least some channel data in the feed store is restricted to ones of said one or more subscribed-to channels associated therewith;
   displaying one of said one or more subscribed-to channels on a display of said mobile unit, wherein displaying one of said one or more subscribed-to channels comprises retrieving channel data from the feed store on the mobile unit; and
   receiving input to navigate through said interactive multimedia content of the displayed subscribed-to channel and to navigate to different ones of said one or more subscribed-to channels;
   wherein the mobile unit further displays one or more system channels and one or more other channels, wherein the one or more system channels comprise a channel listing channel providing information on a plurality of available channels, wherein the mobile unit restricts access to at least some system channel data stored on the mobile unit to said one or more system channels.

2. The method of claim 1 further comprising:
   receiving an interaction with said user interface of said mobile unit to enter preferences applicable to said one or more subscribed-to channels.

3. The method of claim 1 further comprising:
   automatically receiving the updated channel data as content updates for said one or more subscribed-to channels.

4. The method of claim 3 further comprising receiving said content updates responsive to a request from said mobile unit, wherein said request is issued according to one of:
   an update available signal received; and
   passing of a predetermined period of time.

5. The method of claim 1 further comprising:
   running an interactive multimedia runtime container (iMRC) for each of said one or more channels displayed on said mobile unit.

6. The method of claim 5 further comprising:
   combining said channel data and channel application logic in said iMRC to display said one or more channels.

7. The method of claim 6 wherein said channel application logic comprises one of:
   application logic preexisting on said mobile unit; and
   application logic downloaded upon subscription to one of said one or more channels.

8. The method of claim 6 further comprising:
   automatically receiving logic updates for said channel application logic.

9. The method of claim 1 further comprising:
   receiving at least one stream of system channel data at said mobile unit; and
   displaying at least one system channel using said system channel data.

10. The method of claim 9 further comprising:
    restricting access to said system channel data to said at least one system channel.

11. The method of claim 9 wherein said at least one system channel comprise a channel listing providing information on each of said one or more channels available for subscription.

12. The method of claim 1 wherein the input is received through a navigational mechanism on said mobile unit.

13. A mobile device comprising:
    channel application memory for one or more channel applications that provide information for visually presenting one or more subscribed-to channels having interactive multimedia content;
    a feed store for channel data used to populate information for the one or more channel applications, wherein said channel data is stored in channel-specific memory addresses of the feed store, wherein said channel data associated with at least one of the one or more subscribed-to channels is replaced in the feed store when updated channel data arrives to replace it, and wherein access to at least some of said channel data in the feed store is restricted to ones of said one or more subscribed-to channels associated therewith;
    a display for displaying one of said one or more subscribed-to channels, wherein displaying one of said one or more subscribed-to channels comprises retrieving channel data from the feed store; and
    a user interface configured to receive an instruction to subscribe to the one or more subscribed-to channels and configured to receive input to navigate through said interactive multimedia content of the displayed subscribed-to channel and to navigate to different ones of said one or more subscribed-to channels; and
    wherein the mobile device further displays one or more system channels and one or more other channels, wherein the one or more system channels comprise a channel listing channel providing information on a plurality of available channels, wherein the mobile device restricts access to at least some system channel data stored on the mobile device to said one or more system channels.

14. The mobile device of claim 13 wherein the mobile device receives updated channel data responsive to a request from said mobile device, wherein said request is issued according to one of:
    an update available signal received; and
    passing of a predetermined period of time.

15. The mobile device of claim 13 wherein the mobile device receives at least one stream of system channel data and displays at least one system channel using said system channel data, wherein the mobile device restricts access to said system channel data stored on the mobile device to said at least one system channel.

16. The mobile device of claim 15 wherein said at least one system channel comprise a headline channel for displaying a summary of subscribed to channels, said summary displayed in a single channel.

17. The mobile device of claim 13 wherein the input is received through a navigational mechanism on said mobile device.

18. A mobile device comprising:

a phone;

an operating system;

a memory comprising (i) one or more channel applications that provide information for visually presenting one or more subscribed-to channels and (ii) channel data used to populate information for the one or more channel applications, wherein said channel data is stored in channel-specific memory addresses; and a user interface comprising a touch screen, wherein interactive multimedia content of one of the one or more channel applications is displayed on the touch screen, and wherein the user interface is configured to receive input to navigate through said interactive multimedia content of the displayed subscribed-to channel and to navigate to different ones of said one or more subscribed-to channels; and wherein the one or more subscribed-to channels comprise one or more system channels and one or more other channels, wherein the one or more system channels comprise a channel listing channel providing information on a plurality of available channels, wherein the mobile device restricts access to at least some system channel data stored on the mobile device to said one or more system channels.

19. The mobile device of claim 18 wherein the one or more other channels comprise a first channel for which the mobile device receives updated channel data that provides updates to the first channel without providing a complete data change for the first channel.

20. The mobile device of claim 18 wherein the one or more other channels comprise a first channel that only has access rights to channel data in a storage block that directly corresponds to the first channel.

* * * * *